(12) United States Patent
Heiner et al.

(10) Patent No.: US 7,502,371 B2
(45) Date of Patent: Mar. 10, 2009

(54) DISTRIBUTED CONNECTION ADMISSION-CONTROL

(75) Inventors: Andreas Heiner, Espoo (FI); Sergey Balandin, Helsinki (FI); Roberto Barnes, Espoo (FI)

(73) Assignee: Nokia Corporation, Espoo (FI)

( * ) Notice: Subject to any disclaimer, the term of this patent is extended or adjusted under 35 U.S.C. 154(b) by 620 days.

(21) Appl. No.: 11/171,421

(22) Filed: Jul. 1, 2005

(65) Prior Publication Data

US 2006/0187829 A1 Aug. 24, 2006

(30) Foreign Application Priority Data

Feb. 7, 2005 (FI) .................... 20050139

(51) Int. Cl.
*H04L 12/28* (2006.01)
(52) U.S. Cl. ..................................... 370/389
(58) Field of Classification Search ......... 370/229–236, 370/395.2, 355.21, 389
See application file for complete search history.

(56) References Cited

U.S. PATENT DOCUMENTS 6,614,757 B1 * 9/2003 Rochberger et al. ......... 370/231
2002/0049062 A1 4/2002 Peterson
2003/0058880 A1 * 3/2003 Sarkinen et al. ............. 370/413
2004/0120252 A1 * 6/2004 Bowen et al. ............... 370/229
2004/0158644 A1 8/2004 Albuquerque et al.
2005/0041636 A1 2/2005 Iselt et al.

* cited by examiner

*Primary Examiner*—Chirag G Shah
*Assistant Examiner*—Nima Mahmoudzadeh
(74) *Attorney, Agent, or Firm*—Squire, Sanders & Dempsey, LLP

(57) ABSTRACT

A method distributes connection admission control. Traffic flows are distributed locally at network nodes based on determined path weights and dynamic link costs. A traffic source node is sent a back-off signal if a distributing node becomes congested. A received request to admit a new traffic flow to the communications network is admitted if the node receiving the request has not received a back-off signal, and is rejected if the node receiving the request has received a back-off signal and fails to redistribute its traffic flows. Distributed connection admission control is allowed in which only local events need to be monitored to decide whether to admit a new traffic flow or not.

8 Claims, 2 Drawing Sheets

DISTRIBUTED CONNECTION ADMISSION-CONTROL

BACKGROUND OF THE INVENTION

1. Field of the Invention

The invention relates to communication networks. In particular, the invention relates to novel and improved connection admission control for a communications network comprising nodes connected by links.

2. Description of the Related Art

A communication network comprises nodes connected by links. A node refers to a network element implementing a protocol used for communicating with other nodes. A link refers to a communication facility or medium over which nodes can communicate. A communication network may either be connectionless such as an IP-based (Internet Protocol) network, or connection-oriented such as a fixed telephone network. When a traffic flow comprising data packets is transmitted from a given ingress node to a given egress node, there are often multiple different routes available via various nodes and links between the ingress and egress node. These routes are referred to as paths. In the following the term path is used to refer specifically to a loop-free path.

Different paths have different costs associated with them. For example, a given path may have higher delay than another path. Thus it is advantageous to determine these costs beforehand and select a path based on this information. Since a traffic flow comprising packets may be distributed via multiple paths simultaneously, more than one paths may also be selected.

The process of determining costs and selecting paths is often referred to as load distribution. Load in this context refers to the amount of packets or bytes being transferred over nodes and links thus loading them. Distributing traffic flows over multiple paths in a communication network has several advantages, such as fast failure recovery due to pre-existence of multiple available paths between source and destination, higher throughput for a given infrastructure and reduced packet delay. Load distribution may be static, in which case assignment of jobs to hosts is done probabilistically or deterministically, without consideration of runtime events. Alternatively load distribution may be dynamic, in which case it is designed to overcome problems of unknown or uncharacteriseable workloads, non-pervasive scheduling ◊and runtime variation, i.e. any situation where availability of hosts, composition of workload or interaction of human beings can alter resource requirements or availability. Dynamic load distribution systems typically monitor workload and hosts for any factors that may affect the choice of the most appropriate assignment and distribute jobs accordingly. Prior art load distribution includes application U.S. Ser. No. 10/286,477 of Heiner, Balandin, filed Nov. 1, 2002, which is commonly assigned with the present application. The disclosure of this application is incorporated by reference herein. U.S. Ser. No. 10/286,477 relates to a dynamic load distributing method and system using local state information.

Today more and more networks optionally guarantee a certain level of Quality of Service (QoS) to a user or a traffic flow associated with the user. For example, user downloading a video stream may have been guaranteed a certain minimum bandwidth to allow the video stream to download without interruptions.

In order to allow this guarantee of a minimum Quality of Service, a technique known as Connection Admission Control (CAC) has been developed. Connection Admission Control involves admitting a new traffic flow to a network only, if the Quality of Service requirements of the new traffic flow as well as the already existing traffic flows can be maintained. Otherwise the new traffic flow is rejected.

Prior art Connection Admission Control techniques typically involve counting the traffic admitted to the network so far, or measuring the traffic loads in the network. The measurements are then used to decide whether to admit a new traffic flow or not.

Furthermore, prior art Connection Admission Control techniques are typically centralized in the sense that there is a central entity in the network which knows the load state of the whole network and which decides whether to admit a new traffic flow or not. As a consequence, a significant amount of signaling is required in order to keep the central entity up-to-date on the load state of the whole network.

Prior art centralized Connection Admission Control techniques include techniques with single-path routing, techniques with multi-path forwarding, and various combinations thereof. Furthermore, prior art includes polling the load over the complete ingress-egress path with predefined alternative paths.

A global approach, that is, measuring the load via polling the complete path, is common to these prior art techniques. However, the network wide polling has major disadvantages. Most importantly, with multiple ingress nodes all ingress-egress nodes have to be synchronized so that they all have a similar view of the network. Otherwise, route flaps will occur. Furthermore, the network wide polling requires accurate traffic models which are difficult to provide.

Therefore, the object of the present invention is to alleviate the problems described above and to introduce a solution that allows distributed connection admission control in which only local events are monitored to decide whether to admit a new traffic flow or not.

SUMMARY OF THE INVENTION

A first aspect of the present invention is a distributed connection admission control method for a communications network comprising nodes connected by links. The communications network is a packet switched network. Furthermore, the communications network may be a wireless network, wired network, or a combination thereof. In accordance with the method, at least one traffic flow is distributed from a respective ingress node to a respective egress node via at least one respective path in the communications network. Each of the at least one traffic flows has at least one associated minimum service level requirement. The service level requirement may be e.g. a requirement related to Quality of Service, bandwidth, delay, jitter, link cost, reliability, mean time between failure, time for recovery, frequency of failure, security, or a requirement related to a combination of these. The distribution of the at least one traffic flow is performed locally at at least one node, and it comprises the following steps a)-c):

a) at a given node, path weights for paths available for traffic flows sent to the given node are determined;

b) the sent traffic flows are distributed from the given node to at least one neighboring node via respective links on the basis of the determined path weights and dynamic link costs associated with the respective links; and c) at least one traffic source node is sent a back-off signal requesting the at least one traffic source node to send less traffic to the given node, if the given node becomes so congested that the given node fails to distribute at least one traffic flow according to its at least one associated minimum service level requirement.

It is to be understood that the term 'neighboring node' of a particular node refers to a node which is directly, i.e. via one link, connected to the particular node. Furthermore, it is to be understood that the term 'traffic source node' of a particular node refers to such a neighboring node of the particular node which is sending at least one traffic flow to the particular node.

Further in accordance with the distributed connection admission control method, a request to admit a new traffic flow to the communications network is received at an access node. The new traffic flow admission request is admitted, if the access node has not received a back-off signal from another node of the communications network. However, if the access node has received a back-off signal from another node of the communications network, the access node first attempts to redistribute at least one traffic flow to at least one alternative path. If the redistribution attempt at the access node succeeds, the new traffic flow admission request is admitted. On the hand, if the redistribution attempt at the access node fails due to unavailable alternative paths, the new traffic flow admission request is rejected. The term "access node" is used to refer to a node of the communications network that receives the new traffic flow admission request.

A second aspect of the present invention is a communications network node connected by links to at least one other node of a communications network. The communications network node comprises a dynamic load distributor for distributing at least one traffic flow from a respective ingress node to a respective egress node via at least one respective path in the communications network, each of which the at least one traffic flows has at least one associated minimum service level requirement. The dynamic load distributor comprises a calculator for determining path weights for paths available for traffic flows sent to the communications network node. The dynamic load distributor further comprises a flow distributor for distributing the sent traffic flows from the communications network node to at least one neighboring node via respective links on the basis of the determined path weights and dynamic link costs associated with the respective links. The dynamic load distributor further comprises a signaler for sending at least one traffic source node a back-off signal requesting the at least one traffic source node to send less traffic to the communications network node, if the communications network node becomes so congested that the communications network node fails to distribute at least one traffic flow according to its at least one associated minimum service level requirement. The communications network node further comprises a connection admission controller for receiving a request to admit a new traffic flow to the communications network; for admitting the new traffic flow admission request, if the communications network node has not received a back-off signal from another node of the communications network; for redistributing at least one traffic flow to at least one alternative path, if the communications network node has received a back-off signal from another node of the communications network; for admitting the new traffic flow admission request, if the redistribution by the connection admission controller succeeds; and for rejecting the new traffic flow admission request, if the redistribution by the connection admission controller fails due to unavailable alternative paths.

A third aspect of the present invention is a communications network node connected by links to at least one other node of a communications network. The communications network node comprises a dynamic load distributing means for distributing at least one traffic flow from a respective ingress node to a respective egress node via at least one respective path in the communications network, each of which the at least one traffic flows has at least one associated minimum service level requirement. The dynamic load distributing means comprises a calculating means for determining path weights for paths available for traffic flows sent to the communications network node. The dynamic load distributing means further comprises a flow distributing means for distributing the sent traffic flows from the communications network node to at least one neighboring node via respective links on the basis of the determined path weights and dynamic link costs associated with the respective links. The dynamic load distributing means further comprises a signaling means for sending at least one traffic source node a back-off signal requesting the at least one traffic source node to send less traffic to the communications network node, if the communications network node becomes so congested that the communications network node fails to distribute at least one traffic flow according to its at least one associated minimum service level requirement. The communications network node further comprises a connection admission controlling means for receiving a request to admit a new traffic flow to the communications network; for admitting the new traffic flow admission request, if the communications network node has not received a back-off signal from another node of the communications network; for redistributing at least one traffic flow to at least one alternative path, if the communications network node has received a back-off signal from another node of the communications network; for admitting the new traffic flow admission request, if the redistribution by the connection admission controlling means succeeds; and for rejecting the new traffic flow admission request, if the redistribution by the connection admission controlling means fails due to unavailable alternative paths.

A fourth aspect of the present invention is a computer program, embodied on a computer readable medium, for distributed connection admission control for a communications network comprising nodes connected by links. The computer program controls a data-processing device to perform the steps of:

distributing at least one traffic flow from a respective ingress node to a respective egress node via at least one respective path in the communications network, each of the at least one traffic flows having at least one associated minimum service level requirement, the distribution performed locally at at least one node and comprising the following steps a)-c):

a) determining, at a given node, path weights for paths available for traffic flows sent to the given node;

b) distributing the sent traffic flows from the given node to at least one neighboring node via respective links on the basis of the determined path weights and dynamic link costs associated with the respective links; and c) sending at least one traffic source node a back-off signal requesting the at least one traffic source node to send less traffic to the given node, if the given node becomes so congested that the given node fails to distribute at least one traffic flow according to its at least one associated minimum service level requirement;

receiving, at an access node, a request to admit a new traffic flow to the communications network;

admitting the new traffic flow admission request, if the access node has not received a back-off signal;

redistributing at least one traffic flow at the access node to at least one alternative path, if the access node has received a back-off signal;

admitting the new traffic flow admission request, if the redistribution at the access node succeeds; and rejecting the new traffic flow admission request, if the redistribution at the access node fails due to unavailable alternative paths.

In an embodiment of the invention, each determined path weight is an inverse proportional of a static path cost of the respective path.

In an embodiment of the invention, step b) further comprises distributing the sent traffic flows on the basis of the determined path weights and the dynamic link costs such that the ratio of the dynamic link costs will essentially equal the ratio of the determined path weights.

In an embodiment of the invention, the locally performed distribution of the one or more traffic flows further comprises the steps of:

d) redistributing at least one traffic flow at the at least one traffic source node to at least one alternative path in response to the received back-off signal;

e) forwarding a back-off signal received at a present node further to at least one traffic source node, if the traffic flows cannot be redistributed at the present node due to unavailable alternative paths; and f) sending, from a formerly congested node, an all clear signal to at least one traffic source node, once the congestion is over, to indicate to the at least one traffic source node that it can again redistribute traffic flows to the formerly congested node.

The invention allows distributed connection admission control in which only local events need to be monitored to decide whether to admit a new traffic flow or not. Furthermore, the decision is made locally by the access node. No global view of the whole network is required. As a result, the invention decreases significantly signaling needed by prior art centralized Connection Admission Control techniques. Furthermore, the invention first uses all network resources before rejecting any new traffic flows. The invention also requires only minimal human intervention since, once a node is configured appropriately, no further human actions are needed to sustain effective Connection Admission Control in accordance with the invention. Furthermore, the invention has superior scalability and stability characteristics. Scalability is guaranteed by using only local observations to decide whether to admit or reject a new traffic flow. Since decisions are made locally, route flaps will not occur, and thus the invention facilitates stability. As a result, path reservations to guarantee network stability are not needed. Furthermore, accurate—and thus difficult to acquire—traffic models are made unnecessary by the invention as a result of the distributed nature of utilizing locally made decisions.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
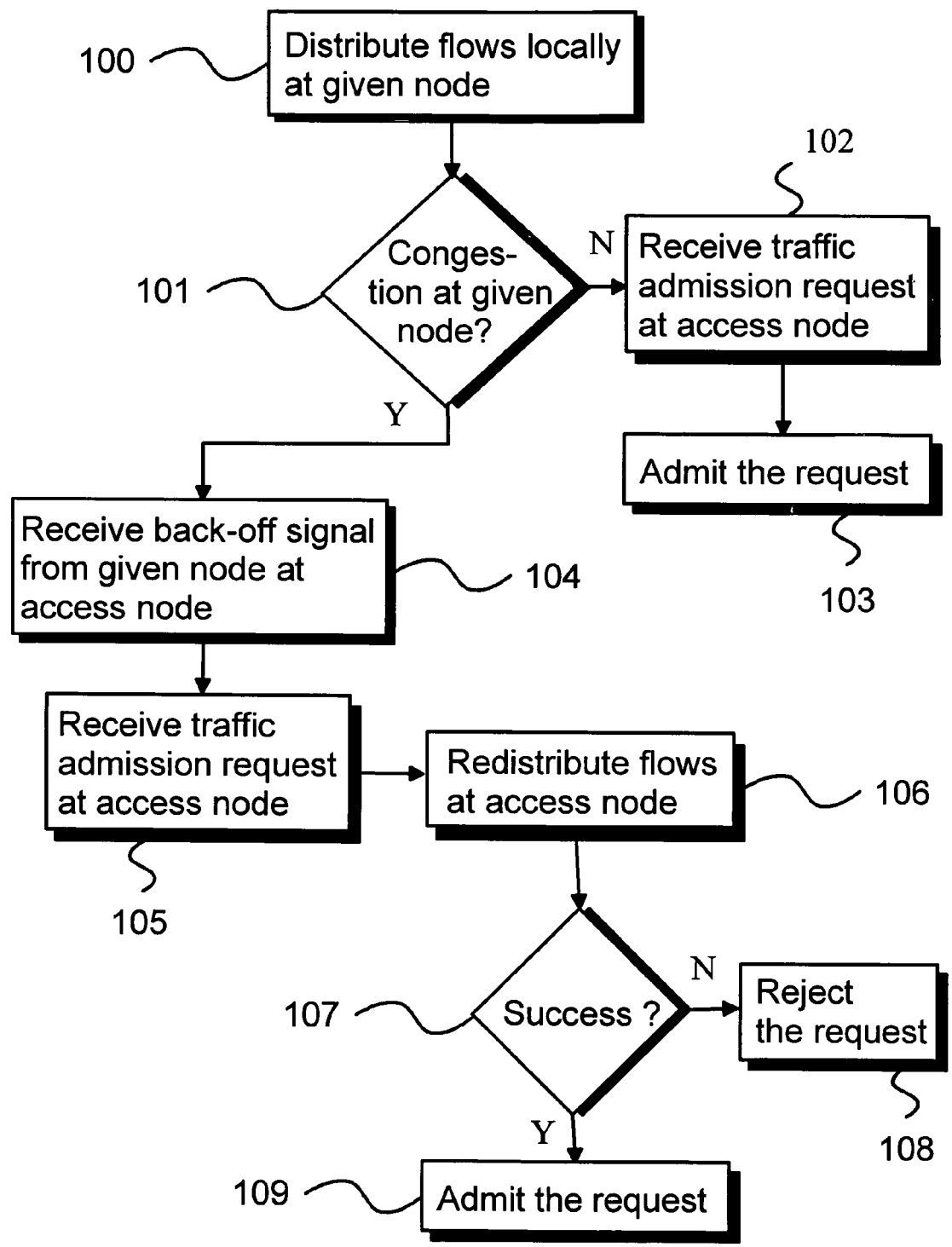
FIG. 1 is a graphical representation illustrating a method according to an embodiment of the present invention.

FIG. 1 illustrates an exemplary embodiment of the method of the present invention relating to distributed connection admission control for a communications network comprising nodes connected by links.

As a part of the inventive method, traffic flows are to be distributed in the communications network from respective ingress nodes to respective egress nodes via respective paths. Each traffic flow has an associated minimum service level requirement. Step 100 of FIG. 1 illustrates distribution of traffic flows locally at a given node of the communications network. However, it is to be understood that similar local traffic flow distribution is often performed at other nodes of the communications network also, typically at most nodes along the paths of the various traffic flows.

The distribution of step 100 involves first determining, at the given node, path weights for paths available for traffic flows sent to the given node. In the exemplary embodiment of FIG. 1 each determined weight is an inverse proportional of a static path cost of the respective path. Next, the sent traffic flows are distributed from the given node via respective links to neighboring nodes on the basis of the determined path weights and dynamic link costs associated with the respective links such that the ratio of the determined dynamic link costs will essentially equal the ratio of the determined path weights.

If, at step 101, the given node becomes congested, that is, it fails to distribute at least one traffic flow according to its at least one associated minimum service level requirement, then traffic source nodes are sent a back-off signal requesting the traffic source nodes to send less traffic to the given node. In other words, a received back-off signal requires the receiving traffic source node to redistribute the traffic flows traversing via it to alternative paths so that less traffic flows will be sent to the node which sent the back-off signal.

If the back-off signal sent from the given node is received, at step 104, by a traffic source node which also, at step 105, receives a request to admit a new traffic flow to the communications network, that is, if an access node acts as a traffic source node receiving the back-off signal, then the access node attempts to redistribute traffic flows traversing via it to alternative paths while also maintaining the associated service level requirements of the traffic flows traversing via the access node, step 106.

If the redistribution attempt at the access node succeeds at step 107, the new traffic flow admission request is admitted, step 109. On the hand, if the redistribution attempt at the access node fails due to unavailable alternative paths, the new traffic flow admission request is rejected, step 108.

In the following, an exemplary embodiment of the distribution of traffic flows is described in more detail.

A communications network node has two possible paths to a destination node via two next hops $nh_1$ and $nh_2$, and is therefore called a junction node $n_j$. The two paths have both a target cost and an actual cost. The target cost is constant over an extended period of time. Typically the target cost is the sum of all inverse link costs, e.g. the link bandwidths. With $c_{k \to k+1}$ representing the static link cost of the link between nodes $n_k \to n_{k+1}$, the path cost $p^{j \to d}$ is the sum of the static link costs $c_{k \to k+1}$ of all links that belong to the path from $n_j \to n_d$.

The time-dependent path cost from $n_j \to n_d$ may be defined in a variety of ways. One possibility is to define it as the static path cost $p^{j \to d}$ but with the link cost $c_{j \to j+1}$ from $n_j$ to it's neighboring node $n_{j+1}$ replaced by the static link cost multiplied by the current link utilization $\lambda_{j \to 1}(t)$. Another possibility is to define the dynamic path cost as the local link utilization $\lambda_{j \to 1}(t)$. In the following the latter definition will be used as simulations have shown that it re-distributes traffic very effectively. It is further assumed that traffic flows use a minimum bandwidth to meet Quality of Service requirements.

The load is distributed over the two links $n_j$-$n_1$ and $n_j$-$n_2$ such that the ratio of the dynamic link costs equals the ratio of the static path costs, i.e.:

$$\frac{\lambda_{j\to 1}(t)}{\lambda_{j\to 2}(t)} = \frac{p^d_{j\to 2}}{p^d_{j\to 1}} \quad \text{Equation 1}$$

where $p^d_{j\to 2}$ is the static path cost from the junction node $n_j$ to the destination node $n_d$ via next hop $n_2$, and $p^d_{j\to 1}$ is the static path cost of the path from the junction node $n_j$ to the destination node $n_d$ via next hop $n_1$. $\lambda_{j\to 1}(t)$ is the actual link utilization or load from the junction node $n_j$ to $n_1$, and $\lambda_{j\to 2}(t)$ that of node $n_j$ to $n_2$. Assuming unit bandwidth, and unit traffic to $n_d$, the traffic distribution over the two paths $\tau^d_{j\to 1}(t)$ and $\tau^d_{j\to 2}(t)$ is inverse proportional to the path costs:

$$\frac{\tau^d_{j\to 1}(t)}{\tau^d_{j\to 2}(t)} = \frac{p^d_{j\to 2}}{p^d_{j\to 1}} \quad \text{Equation 2}$$

The crux is that $\lambda_{j\to 1}(t)$ and $\lambda_{j\to 2}(t)$ also contain traffic to other destinations $n_{d'}$ that make use of the link $n_j \to n_1$ or $n_j \to n_2$. That is, traffic $\tau^{d'}(t)$ will make more use of the path via node $n_2$ than via $n_1$. Assuming that at time $t_0$ traffic to $n_{d'}$ arrives at $n_j$:

$$\frac{p^d_{j\to 2}}{p^d_{j\to 1}} = \frac{\tau^d_{j\to 1}(t)}{\tau^d_{j\to 2}(t)} \to \frac{\tau^d_{j\to 1}(t') - \delta(\tau^{d'}(t'))}{\tau^d_{j\to 2}(t') + \delta(\tau^{d'}(t'))} \quad \text{Equation 3}$$

Traffic to node $n_d$ will redistribute such that less traffic is sent via $n_1$ and more via $n_2$. The exact shift depends, amongst other things, on the extra traffic to node $n_{d'}$, $\tau^{d'}_{j\to 1}(t)$. That in turn depends on the ratio of the path cost $p^{d'}_{j\to 1}$ and $p^{d'}_{j\to 3}$, and the total traffic amount to $n_{d'}$. In accordance with the invention, the traffic over the links to $n_1$ and $n_2$ never exceeds the capacities of the respective links.

If there is no possibility to redistribute the traffic any further, the junction node $n_j$ signals to all its neighboring nodes to send less traffic. These nodes will redistribute the traffic via other paths if possible, otherwise they will relay the request. Once the congested state at $n_j$ is eliminated, the node signals to its neighbors that it the normal situation can be restored.

To further facilitate the distribution of traffic flows, the above basic mechanism may be modified as follows. The path weight $w^d_{j\to 1}$ is defined as the inverse proportional of the path cost, i.e. $w^d_{j\to 1} \to 1/p^d_{j\to 1}$. The default value of the path weight is $1/p^d_{j\to 1}$. This, however, does not change Eq. 1:

$$\frac{p^d_{j\to 2}}{p^d_{j\to 1}} = \frac{\lambda_{j\to 1}(t)}{\lambda_{j\to 2}(t)} \to \frac{w^d_{j\to 1}}{w^d_{j\to 2}} = \frac{\lambda_{j\to 1}(t)}{\lambda_{j\to 2}(t)} \quad \text{Equation 4}$$

Assuming that $n_2$ becomes congested, for example due to it being part of many different paths, $n_2$ signals to all its neighboring nodes including $n_j$ to send less traffic. The junction node $n_j$ decreases the path weight $w^d_{j\to 2}$ by an amount $\Delta w_{j\to 2}$, thereby increasing the amount of traffic sent via the link $n_j \to n_1$. If in turn the junction node $n_j$ becomes congested, the junction node $n_j$ can request the neighboring nodes to redistribute.

It should be understood that there is a fundamental difference between path cost and path weight. All nodes can calculate the path cost for any pair of nodes. Moreover, all nodes will calculate the same value. Therefore, path cost is a global parameter. The path weight, on the other hand, is the local view of the path cost, in that it is a correction to the path cost based on the congestion level of the next hop along the path. The invention aims to keep the global and local views synchronized by distributing the load proportional to the path weight.

Figure 2:
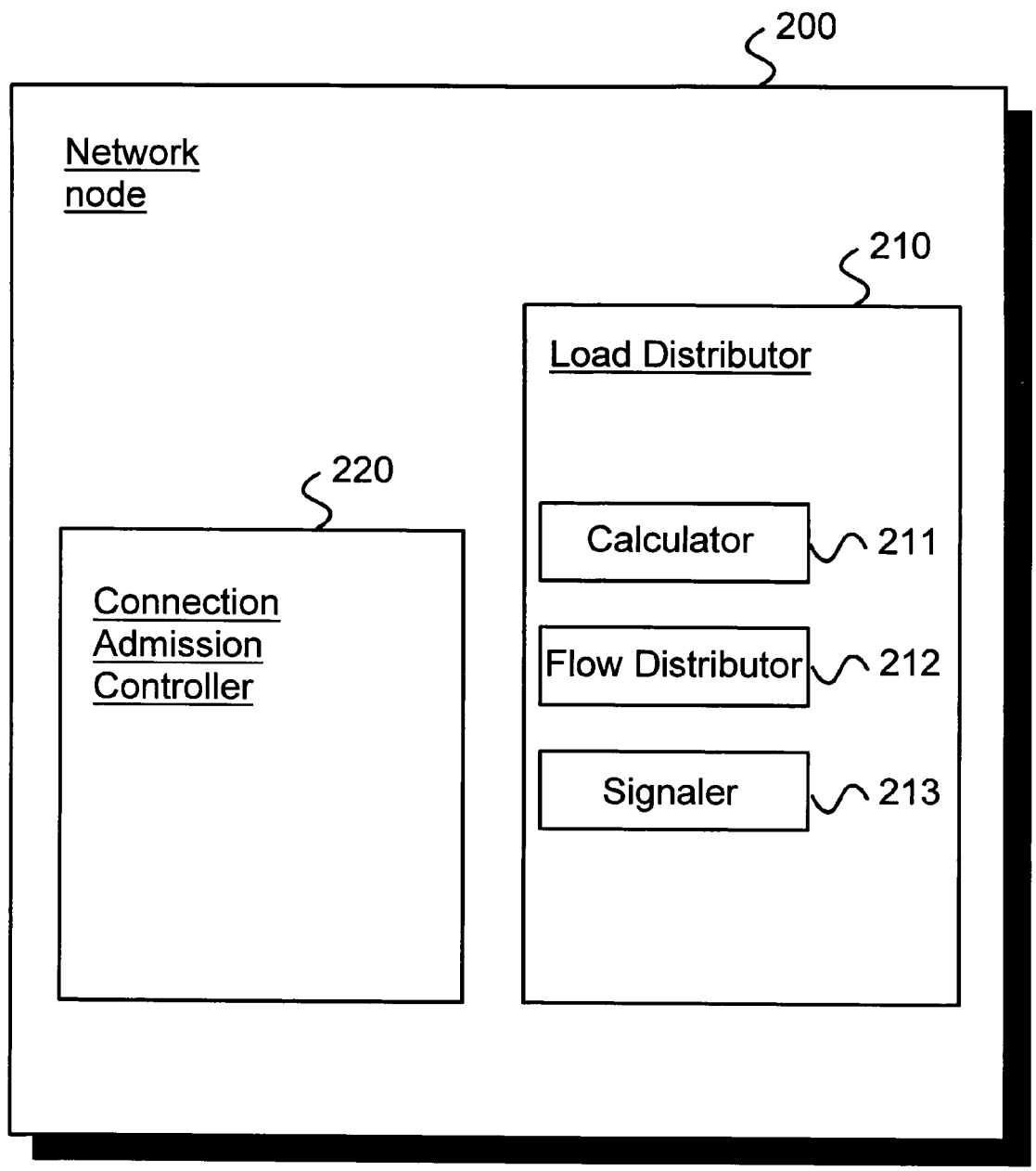
FIG. 2 is a block diagram illustrating a network node according to an embodiment of the present invention.

FIG. 2 illustrates an exemplary embodiment of the communications network node 200 of the present invention. The communications network node 200 comprises a dynamic load distributor 210 for distributing traffic flows from respective ingress nodes to respective egress nodes via respective paths in a communications network. The traffic flows each have at least one associated minimum service level requirement. The communications network node 200 is connected by links to other nodes of a communications network (not illustrated).

In the exemplary embodiment of FIG. 2, the dynamic load distributor 210 comprises a calculator 211 for determining path weights for paths available for traffic flows sent to the communications network node 200.

The dynamic load distributor 210 further comprises a flow distributor 212 for distributing the sent traffic flows from the communication network node 200 to neighboring nodes via respective links on the basis of the determined path weights and dynamic link costs associated with the respective links. The dynamic load distributor 210 further comprises a signaler 213 for sending traffic source nodes a back-off signal requesting the traffic source nodes to send less traffic to the communications network node 200, if the communications network node 200 becomes so congested that the communications network node 200 fails to distribute at least one traffic flow according to its at least one associated minimum service level requirement.

The communications network node 200 further comprises a connection admission controller 220 for receiving a request to admit a new traffic flow to the communications network. The connection admission controller 220 is further configured to admit the new traffic flow admission request, if the communications network node 200 has not received a back-off signal from another node of the communications network. The connection admission controller 220 is further configured to redistribute at least one traffic flow to at least one alternative path, if the communications network node 200 has received a back-off signal from another node of the communications network. The connection admission controller 220 is further configured to admit the new traffic flow admission request, if the redistribution by the connection admission controller 220 succeeds. The connection admission controller 220 is further configured to admit the new traffic flow admission request, if the redistribution by the connection admission controller 220 fails due to unavailable alternative paths.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method, comprising:
   distributing at least one traffic flow from a respective ingress node to a respective egress node via at least one respective path in a communications network, each of said at least one traffic flow having at least one associated minimum service level requirement, said distributing performed locally at an at least one node and comprising determining, at a given node, path weights for paths available for traffic flows sent to said given node, each path weight being an inverse proportion of a static path cost of the at least one respective path, distributing said traffic flows from said given node to at least one neighboring node via respective links based on said path weights and dynamic link costs associated with said respective links such that a ratio of said dynamic link costs essentially equals a ratio of said path weights, and sending at least one traffic source node a back-off signal requesting said at least one traffic source node to send less traffic to said given node, if said given node becomes so congested that said given node fails to distribute the at least one traffic flow according to the at least one associated minimum service level requirement, receiving, at an access node, a request to admit a new traffic flow to said communications network, admitting said request, if an access node has not received the back-off signal redistributing the at least one traffic flow at said access node to at least one alternative path, if said access node has received the back-off signal, admitting said request, if said redistributing at said access node succeeds, and rejecting said request, if said redistributing at said access node fails due to unavailable alternative paths.

2. The method according to claim 1, wherein said locally performed distributing further comprises redistributing the at least one traffic flow at said at least one traffic source node to the at least one alternative path in response to said back-off signal, forwarding the back-off signal received at a present node further to the at least one traffic source node, if said traffic flows cannot be redistributed at said present node due to unavailable alternative paths, and sending, from a formerly congested node, an all clear signal to the at least one traffic source node, once congestion is over, to indicate to said at least one traffic source node to redistribute traffic flows to said formerly congested node.

3. An apparatus, comprising:

a dynamic load distributor configured to distribute at least one traffic flow from a respective ingress node to a respective egress node via at least one respective path in a communications network, each of said at least one traffic flow having at least one associated minimum service level requirement, said dynamic load distributor comprising, a calculator configured to determine path weights for paths available for traffic flows sent to said communications network node, each path weight being an inverse proportion of a static path cost of the at least one respective path, a flow distributor configured to distribute said traffic flows from said communications network node to at least one neighboring node via respective links based on said path weights and dynamic link costs associated with said respective links such that a ratio of said dynamic link costs essentially equals a ratio of said path weights, a signaler configured to send at least one traffic source node a back-off signal requesting said at least one traffic source node to send less traffic to said communications network node, if said communications network node becomes so congested that said communications network node fails to distribute the at least one traffic flow according to the at least one associated minimum service level requirement, and a connection admission controller configured to receive a request to admit a new traffic flow to said communications network, to admit said request, if said communications network node has not received the back-off signal from another node of said communications network, to redistribute the at least one traffic flow to at least one alternative path, if said communications network node has received the back-off signal from the another node of said communications network, to admit said request, if said redistribution succeeds, and to reject said request, if said redistribution fails due to unavailable alternative paths.

4. An apparatus, comprising:

a dynamic load distributing means for distributing at least one traffic flow from a respective ingress node to a respective egress node via at least one respective path in a communications network, each of said at least one traffic flow having at least one associated minimum service level requirement, said dynamic load distributing means comprising, a calculating means for determining path weights for paths available for traffic flows sent to said communications network node, each path weight being an inverse proportion of a static path cost of the at least one respective path, a flow distributing means for distributing said traffic flows from said communications network node to at least one neighboring node via respective links based on said path weights and dynamic link costs associated with said respective links such that a ratio of said dynamic link costs essentially equals a ratio of said path weights, a signaling means for sending at least one traffic source node a back-off signal requesting said at least one traffic source node to send less traffic to said communications network node, if said communications network node becomes so congested that said communications network node fails to distribute the at least one traffic flow according to the at least one associated minimum service level requirement, and a connection admission controlling means for receiving a request to admit a new traffic flow to said communications network, for admitting said request, if said communications network node has not received the back-off signal from another node of said communications network, for redistributing the at least one traffic flow to at least one alternative path, if said communications network node has received the back-off signal from the another node of said communications network, for admitting said request, if said redistribution succeeds, and for rejecting said request, if said redistribution fails due to unavailable alternative paths.

5. A computer readable medium comprising a computer program, said computer program configured to control a processor to perform:

distributing at least one traffic flow from a respective ingress node to a respective egress node via at least one respective path in a communications network, each of said at least one traffic flow having at least one associated minimum service level requirement, said distributing performed locally at an at least one node and comprising determining, at a given node, path weights for paths available for traffic flows sent to said given node, each path weight being an inverse proportion of a static path cost of the at least one respective path, distributing said traffic flows from said given node to at least one neighboring node via respective links based on said path weights and dynamic link costs associated with said respective links such that a ratio of said dynamic link costs essentially equals a ratio of said path weights;

sending at least one traffic source node a back-off signal requesting said at least one traffic source node to send less traffic to said given node, if said given node becomes so congested that said given node fails to distribute the at least one traffic flow according to the at least one associated minimum service level requirement;

receiving, at an access node, a request to admit a new traffic flow to said communications network;

admitting said request, if an access node has not received the back-off signal;

redistributing the at least one traffic flow at said access node to at least one alternative path, if said access node has received the back-off signal;

admitting said request, if said redistribution at said access node succeeds; and rejecting said request, if said redistribution at said access node fails due to unavailable alternative paths.

6. A method, comprising:

forwarding in a third node a traffic flow having a quality requirement toward a second node via a communication path in a communications network, the forwarding comprising determining in a third node path weights for paths to the second node, each path weight correlating negatively with a static cost of the paths, said forwarding based on said path weights and dynamic link costs of links comprised in the paths such that a ratio of the dynamic link costs essentially equals a ratio of said path weights, and sending a traffic source node a back-off signal requesting the traffic source node to send less traffic to the third node, if the third node becomes so congested that it fails to distribute the traffic flow according to the quality requirement, admitting a request for a new traffic flow in the third node if the third node has not received the back-off signal, or if the third node has received the back-off signal but redistribution of at least one traffic flow at the third node to an alternative path succeeds.

7. A computer readable medium comprising a computer program, said computer program configured to control a processor to perform: forwarding in a third node a traffic flow having a quality requirement toward a second node via a communication path in a communications network, the forwarding comprising determining in a third node path weights for paths to the second node, each path weight correlating negatively with a static cost of the paths, said forwarding based on said path weights and dynamic link costs of links comprised in the paths such that a ratio of the dynamic link costs essentially equals a ratio of said path weights, and sending a traffic source node a back-off signal requesting the traffic source node to send less traffic to the third node, if the third node becomes so congested that it fails to distribute the traffic flow according to the quality requirement, admitting a request for a new traffic flow in the third node if the third node has not received the back-off signal, or if the third node has received the back-off signal but redistribution of at least one traffic flow at the third node to an alternative path succeeds.

8. An apparatus, comprising:

a dynamic load distributor configured to forward a traffic flow towards an egress node via a communication path in a communications network, said traffic flow having a quality requirement, and the dynamic load distributor comprising a calculator configured to determine path weights for paths to the egress node, each path weight correlating negatively with a static cost of the paths, a flow distributor configured to perform said forwarding based on said path weights and dynamic link costs of links comprised in the paths such that a ratio of the dynamic link costs essentially equals a ratio of said path weights, and a signaler configured to send a traffic source node a first back-off signal requesting the traffic source node to send less traffic to the egress node, if the egress node becomes so congested that it fails to distribute the traffic flow according to the quality requirement, the apparatus further comprising a connection admission controller configured to admit a request for a new traffic flow in the apparatus if the apparatus has not received a second back-off signal requesting the apparatus to send less traffic, or if the apparatus has received the second back-off signal but redistribution of at least one traffic flow at the apparatus to an alternative path has succeeded.

* * * * *